(12) United States Patent
Rosenberg

(10) Patent No.: US 7,078,122 B1
(45) Date of Patent: Jul. 18, 2006

(54) HIGH EFFICIENCY PROCESS FOR TREATING MIXED METAL WASTE

(76) Inventor: Ariel Rosenberg, 7 Hazav Street, 84965 Omer (IL)

( * ) Notice: Subject to any disclaimer, the term of this patent is extended or adjusted under 35 U.S.C. 154(b) by 190 days.

(21) Appl. No.: 10/048,252

(22) PCT Filed: Jul. 25, 2000

(86) PCT No.: PCT/IL00/00442

§ 371 (c)(1),
(2), (4) Date: May 28, 2002

(87) PCT Pub. No.: WO01/08245

PCT Pub. Date: Feb. 1, 2001

(30) Foreign Application Priority Data

Jul. 26, 1999 (IL) .................................... 131110

(51) Int. Cl.
*H01M 6/52* (2006.01)
*C22B 26/00* (2006.01)
(52) U.S. Cl. .......................... 429/49; 75/711
(58) Field of Classification Search ............ 429/49
See application file for complete search history.

(56) References Cited

U.S. PATENT DOCUMENTS

| 4,096,045 A | 6/1978 | Ahonen et al. |
| 4,637,928 A | 1/1987 | Zajac et al. |
| 4,874,429 A | 10/1989 | Bertha |
| 5,429,887 A * | 7/1995 | Lyman et al. ............. 429/49 |
| 6,120,927 A * | 9/2000 | Hayashi et al. ........... 429/49 |

FOREIGN PATENT DOCUMENTS

WO  WO 99/37823  7/1999

OTHER PUBLICATIONS

Shibata, J. et al "Development of . . . Battery", Treatment and Minimization of Heavy Metal-Containing Wastes, 1995; XP000892801.

Pingwei, Z. et al "Hydrometallurgical process . . . Batteries", Hydrometallurgy, NL, Elsevier Scientific Pub. Cy. Amsterdam, vol. 47, No. 2-3, 1998, pp. 259-271, XP004109817.

Chemical Abstracts, vol. 114, No. 16, Apr. 22, 1991, abst. No. 147669, Kadar, Endre et al: "Recovery of cadmium . . . batteries" XP002153538.

Patent Abstracts of Japan, vol. 1998, No. 14, Dec. 31, 1998 & JP 10 255862, Sep. 25, 1998.

* cited by examiner

*Primary Examiner*—Roy King
*Assistant Examiner*—Kathleen McNelis
(74) *Attorney, Agent, or Firm*—Anderson Kill & Olick, PC

(57) ABSTRACT

A process for rendering hazardous materials present in multi-element waste non-hazardous, and for recovering valuable components of said waste, particularly metals, comprising contacting the waste with an aqueous solution of HX, wherein X is halogen, thereby converting metals present in the waste to the corresponding halides, and subsequently separating said metal halides from other components of the reaction mixture and from each other.

10 Claims, 3 Drawing Sheets

HIGH EFFICIENCY PROCESS FOR TREATING MIXED METAL WASTE

FIELD OF THE INVENTION

The present invention is concerned with the treatment of mixed metal waste. More specifically, the present invention relates to a process for separating and recovering metals from mixed waste by means of converting said metals to the corresponding halides, and to apparatus for carrying out said process.

BACKGROUND OF THE INVENTION

The large-scale production of waste materials, primarily in industrialized countries, has led to major ecological and economic problems on a worldwide scale. Waste materials, which may be defined as undesired substances that result from the production or use of a desirable, useful material, are of three main types: household, industrial and toxic or hazardous waste.

In the absence of efficient waste recycling plants, very large amounts of waste materials are deposited in landfill sites, which entails high cost, both to the environment and to the economy. In addition to the problems arising from pollution, fire and explosion risk, an additional concern is the loss of potentially valuable raw materials which could otherwise be recycled for use as starting materials or intermediates for many manufacturing processes.

While many different recycling technologies have been developed, these are generally applicable only to single materials or a class of materials, and hence require sorting or pre-processing of the waste.

The problem is compounded when the waste material includes highly toxic, inflammable, and potentially explosive substances. The increasingly widespread use, and hence disposal, of electrical batteries provides an example of the generation of toxic waste from industrial and household sources. Electrical batteries are a source of chemical contamination, as a result of their toxic components such as cadmium, cobalt and nickel. In addition, they may pose a fire hazard and explosion risk as a consequence of components such as Lithium and other exothermic materials.

U.S. Pat. No. 4,637,928 discloses a method for treating articles such as batteries by opening the battery casings and contacting the interiors of said batteries with an alkaline agent.

Co-owned International patent application no. PCT/IL99/00045, incorporated herein by reference, discloses a recovery process for mixed waste, in which components such as metals are separated from each other as halides, following gaseous phase halogenation. Although this process is highly efficient, for certain applications the equipment required may be relatively expensive.

It is a purpose of the present invention to provide a highly efficient process for the recovery of metals from unsorted mixed waste, in particular from electrical batteries. It is a further purpose of the present invention to convert hazardous components present in the waste to non-hazardous materials.

It is another object of the present invention to provide a process that is ecologically clean, economically advantageous and industrially convenient.

It is a further object of the present invention to provide a process for rendering electrical batteries non-hazardous, while also permitting recovery of the valuable raw materials contained therein.

Other objects and advantages of the invention will become apparent as the description proceeds.

SUMMARY OF THE INVENTION

It has now been found that it is possible to render hazardous mixed-waste materials non-hazardous by virtue of their contact with an aqueous solution of HX, wherein X is a halogen, and to recover certain valuable components, particularly metals, from said waste. Recovery of the metallic components is achieved by virtue of their conversion to the corresponding halides, said metal halides being subsequently separated from the reaction mixture and from each other. Thus, the aqueous HX solution serves two distinct purposes: firstly, to provide a medium in which hazardous material can be rendered non-hazardous, and secondly, to permit the recovery of valuable metals therefrom in the form of halides.

Thus, the present invention provides a high efficiency process for rendering hazardous materials present in multi-element waste non hazardous, and for recovering valuable components of said waste, particularly metals, comprising contacting the waste with an aqueous solution of HX, wherein X is halogen, thereby converting metals present in the waste to the corresponding halides, and subsequently separating said metal halides from other components of the reaction mixture and from each other.

According to a preferred embodiment of the present invention, the waste to be treated comprises electrical batteries, such as lithium or nickel batteries. In another embodiment, the waste comprises electrical equipment or electrical devices, e.g., cellular telephones, which may optionally be treated according to the invention together with the batteries contained therein.

A major advantage associated with the application of the present invention to the treatment of lithium batteries is that the process involves a reaction between the components of the batteries and an aqueous solution of HX, namely, a reaction in the liquid phase. This permits hazardous compressed gases such as $SO_2$ or $SOCl_2$, that are present in said batteries as the electrolytic medium, to be absorbed by the aqueous solution. In addition, according to the present invention, hazardous lithium metal is converted in the solution to LiX.

In a preferred embodiment of the invention, oxidising agents are present in the aqueous solution of HX, to enhance the oxidation power of the solution. Preferably, the oxidising agent is hydrogen peroxide, the concentration of which in the solution is between 0.1 and 5% (w/w).

The term "the reaction" is used hereinafter to refer to the conversion of the metals present in the waste to the corresponding halides, by the reaction of said metals with HX, wherein X is a halogen, or optionally by the reaction of said metals with the above mentioned oxidising agents. In a preferred embodiment, the reaction is carried out at a temperature of between 20 and 90° C., and more preferably, at a temperature of between 50 and 80° C.

In a preferred embodiment of the invention, the aqueous solution containing HX is HCl solution or HBr solution, HCl solution being most preferred. The concentration of the solution is between 5 and 33% (w/w), more preferably between 15 and 25% (w/w). In another preferred embodiment, an aqueous solution containing a combination of HCl and HBr is used in the reaction. A preferred combination is provided by a solution of HCl, comprising between 1 and 10% (w/w) HBr.

Preferably, the reaction is performed with agitation. Preferred modes of agitation are selected from the group of mixing, vibrating, shredding, liquid circulation, and forced gaseous/air turbulent mixture aeration.

Preferably, the waste material is brought into contact with the aqueous solution of HX at a controlled rate, to allow controlled evolution of the gaseous $H_2$ formed in the reaction. This gas is preferably removed from the reaction mixture, together with other gases that are not dissolved by the reaction mixture, or which are only partially dissolved thereby, and are optionally recovered. Preferably, the reaction is carried out under reduced pressure in order to facilitate the removal of said gases.

The waste material may also contain various gases that are soluble in the aqueous reaction medium, for example, $SO_2$ and $SOCl_2$, as found in lithium batteries. These gases are rendered non-hazardous by virtue of their becoming absorbed by the aqueous medium. In addition, the dissolved gases increase the acidity of the solution, and the halide-containing gases such as $SOCl_2$ act as a halide source for the reaction solution.

The separation of the metal halides from the reaction mixture and their subsequent separation from each other are accomplished by methods known in the art. Most of the metal halides formed in accordance with the present invention are water soluble, and therefore, in order to separate said halides from the reaction mixture, known liquid/solid separation techniques may be employed, such as, for example, filtration. Thus, in a preferred embodiment of the present invention, the reaction mixture is filtered to obtain a filtrate containing said soluble halides. Typically, the filter cake consists of plastics and carbon materials that were initially present in the raw waste, and did not undergo chemical reaction. The filter cake may also contain insoluble metal oxides, which may be recovered, if desired, by treating said cake with a base.

In a preferred embodiment of the present invention, the metals are recovered from the filtrate by causing the selective precipitation of some of the metals. Optionally, metal recovery may also be achieved by using ion exchange or selective extraction. Preferably, the selective precipitation is carried out by treating the filtrate with an alkaline agent, preferably NaOH, to allow the separation between water soluble hydroxides, particularly, LiOH, from water insoluble hydroxides, such as $Fe(OH)_3$, $Ni(OH)_2$, $Cd(OH)_2$, $Co(OH)_2$ and $Al(OH)_3$. Subsequently, the non soluble hydroxides are separated from the liquid phase, preferably by filtration, and the filtrate, containing $Li^+$ (and $Na^+$), is further treated to cause the selective precipitation of lithium, preferably in the form of LiF or $LiCO_3$, generally by introducing into said filtrate $Na_2CO_3$ or NaF. The water insoluble lithium salt may be separated by filtration, and the filtrate obtained is preferably evaporated to recover NaCl therefrom. The insoluble hydroxides are separable by methods known in the art.

According to the present invention, metals, the halides of which are water insoluble, may also be present in the mixed waste. These metals may be recovered from the solid phase of the reaction mixture by standard methods.

Optionally, the reaction according to the present invention is preceded by heat treatment of the raw waste material and/or mechanical processing of said waste material. In one embodiment, the heat treatment is performed prior to said mechanical processing. In a second embodiment, the waste material is subjected to simultaneous heat treatment and mechanical processing. The mechanical processing is intended to transform the waste into a particulate form, to facilitate the reaction. In one embodiment, the reaction is carried out concurrently with said processing.

The optional heat treatment stage is performed under conditions allowing the removal from the waste of gases or liquids, particularly water, and organic material, which typically constitute part of the raw waste material, preferably by evaporation in the case of water, and evaporation or carbonization in case of organic matter. The heat treatment is performed in a controlled oxygen atmosphere preferably at a temperature of less than 1000° C. Alternatively, the heat treatment may be performed in a metallic molten bath, said bath preferably being at a temperature of between 500° C. and 1600° C. According to another embodiment, the heat treatment is pyrolysis.

The optional mechanical processing of the waste, prior to the reaction with an aqueous solution of HX according to the present invention, is intended to remove the coating from the metal parts and to reduce the waste particle size, in order to provide small metallic particles which may easily react with said HX, thus facilitating both rapid reaction times and also easier handling of the partially processed waste material. The mechanical processing preferably comprises one or more of the following operations: mechanical shaping of solid waste into units of a size and shape appropriate for subsequent processing;

shredding, scraping, crushing and/or milling;

briquetting of sludge.

Preferably, the mechanical processing comprises shredding the waste material in a controlled environment. In a preferred embodiment, the controlled environment is provided by a gas such nitrogen or a noble gas, e.g., argon, or a liquid.

In another preferred embodiment of the present invention, said heat treatment and/or said mechanical processing are carried out in either order, subsequent to the reaction. In another embodiment, the mechanical processing and the reaction are carried out concurrently.

In another aspect, the invention is directed to an apparatus for rendering hazardous materials present in multi-element waste non-hazardous, and for recovering valuable components of said waste, comprising:

a reaction chamber, for reacting multi-element waste with a solution of HX, wherein X is a halogen;

means for introducing said waste into said reaction chamber at a controlled rate;

means for removing gaseous products from the reaction chamber;

means for discharging the metal halide products from the reaction chamber and means for separating said metal halides from each other.

According to a preferred embodiment, the apparatus further comprises a heating chamber comprising means of heating, a waste inlet and an outlet leading from said heating chamber to the reaction chamber. According to one preferred embodiment of the invention, the apparatus further comprises means for the mechanical processing of the waste material, which means is preferably a shredder, located between said outlet of the heating chamber and the inlet of the reaction chamber. Alternatively, the shredder may be positioned at the inlet of said heating chamber. According to another embodiment, the shredder is located within the heating chamber or in the reaction chamber.

The reaction chamber is preferably equipped with heating/cooling means and with agitation means.

Preferably, the means for introducing raw waste material into said reaction chamber at a controlled rate comprises a conveying system such as a conveyor belt, which transports the waste to the reaction chamber. In one preferred embodiment, the conveyor belt is fully enclosed in a protected atmosphere, provided by a gas such as nitrogen or argon that will not react with the hazardous components which may be part of the raw waste. When the apparatus according to the present invention comprises a shredder, the shredding rate is controlled to allow the waste material to be discharged therefrom, and to be fed into the reaction chamber, at a desired rate.

Preferably, the means for removing gaseous products from the reaction chamber comprises a scrubbing system.

BRIEF DESCRIPTION OF THE DRAWINGS

The present invention will be more clearly understood from the detailed description of the preferred embodiments and from the attached drawings in which.

DETAILED DESCRIPTION OF PREFERRED EMBODIMENTS

Figure 1:
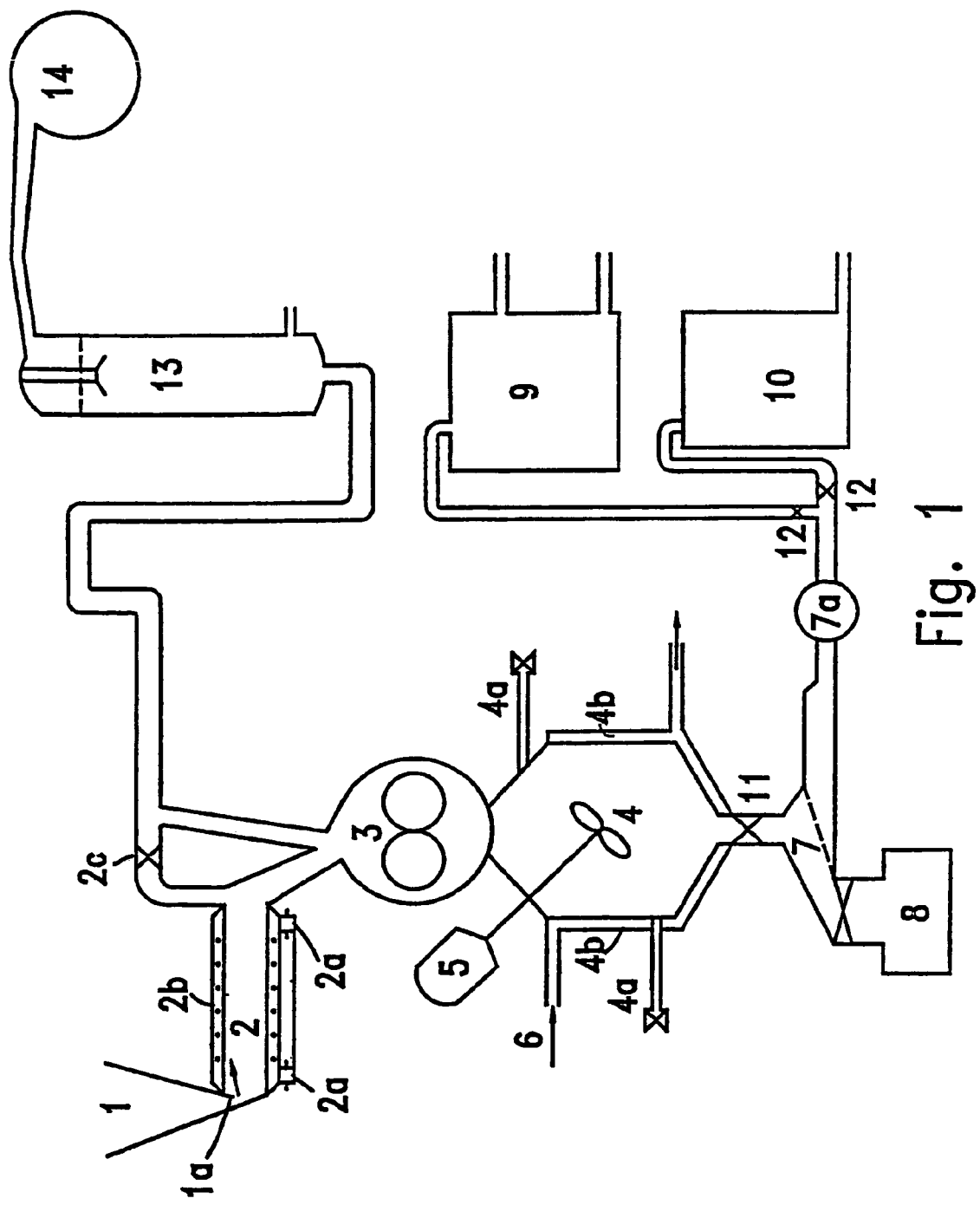
FIG. 1 is a schematic diagram of one embodiment of an apparatus for performing high efficiency treatment of mixed metal-containing wastes.

According to one embodiment of the present invention, which will be described with reference to FIG. 1, the waste to be treated is inserted into a hopper 1, which is maintained at a controlled atmosphere, provided by a gas such as nitrogen or argon, and is further provided with a means for controlling the rate of discharge of the waste therefrom. Controlled, predetermined amounts of waste pass through a gate, 1a, to enter the heating chamber, 2. Heating chamber, 2, which is maintained at a controlled atmosphere, preferably rotates on wheels, 2a, and is heated by external heating elements, 2b, or by a burner in a controlled atmosphere. The concentrations of oxygen and/or gaseous components in the heating chamber are regulated by the gate valves, 1a. The amount of waste being transported through the chamber is regulated by the rotating speed of the chamber or by other transporting means such as a walking beam or conveyor belt. The waste falls by gravity into the shredding chamber, 3, which comprises known components such as jaw crushers, rotating shredding knives, etc. The size of the shredded particles vary according to the type of waste material, speed of operation and so forth. The shredder operates within a protected atmosphere, in which the levels of water and other liquid and gaseous components are controlled. The shredding rate is adjusted according to the rate of reaction in the reaction chamber, 4, and in particular, according to the rate of gas generation and/or removal. The reaction chamber, 4, is made of a material that will withstand a chemical reaction between metals and HX solutions at temperatures up to 140° C., such as various common polymers, for example, polyamide or PVDF. Said reaction chamber is fitted with inlets/outlets, 4a, for the introduction of various chemicals in liquid form for the reaction and also for circulating the solution through an externally placed heat exchanger. In a preferred embodiment a solution of 15–30% HCl, 0.1–1% $H_2O_2$, 0.05–10% HBr and 0–10% sulfuric acid is used for the reaction with batteries. The reaction chamber may also be fitted with a heating or cooling jacket, 4b, where a liquid, 6, may be introduced from another external source. Other heating elements (for example electrical elements) can also be incorporated into the design of the reaction chamber. A mixing device, 5, is used to mix the solution and the shredded material in order to improve the reaction between the waste material and the HX solution. The mixing speed may be adjusted according to the type of reaction mixture, particle size, and other chemical and physical parameters. In another preferred embodiment, air is injected into the lower region of the reactor in order to assist in mixing the particles and to add oxygen to the reaction. The gases that evolve during the course of the reaction, and also the gases which were already present in the waste material, such as $SO_2$, will be absorbed by the solution of the reactor, or will react with said solution. The non-dissolved gases will then be bubbled upwards to be collected in the scrubbing system, 13, through the fan blower system, 14. The undissolved materials, mainly plastics are discharged through a conduit, 11, at the lower end of the reaction chamber, 4, passing through liquid filter apparatus, 7, to be discharged to solid waste chamber 8. The liquid phase containing the metal chlorides is delivered, by means of pump, 7a, through valves 12 to various means, 9 and 10, for separating the metal halides, said means being based on known technologies such as selective precipitation, extraction, absorption and ion exchange. The separating means 9, and 10 also remove contaminants from the metal halides, thus permitting further processing of said metal halides into commercially-useful compositions.

Figure 2:
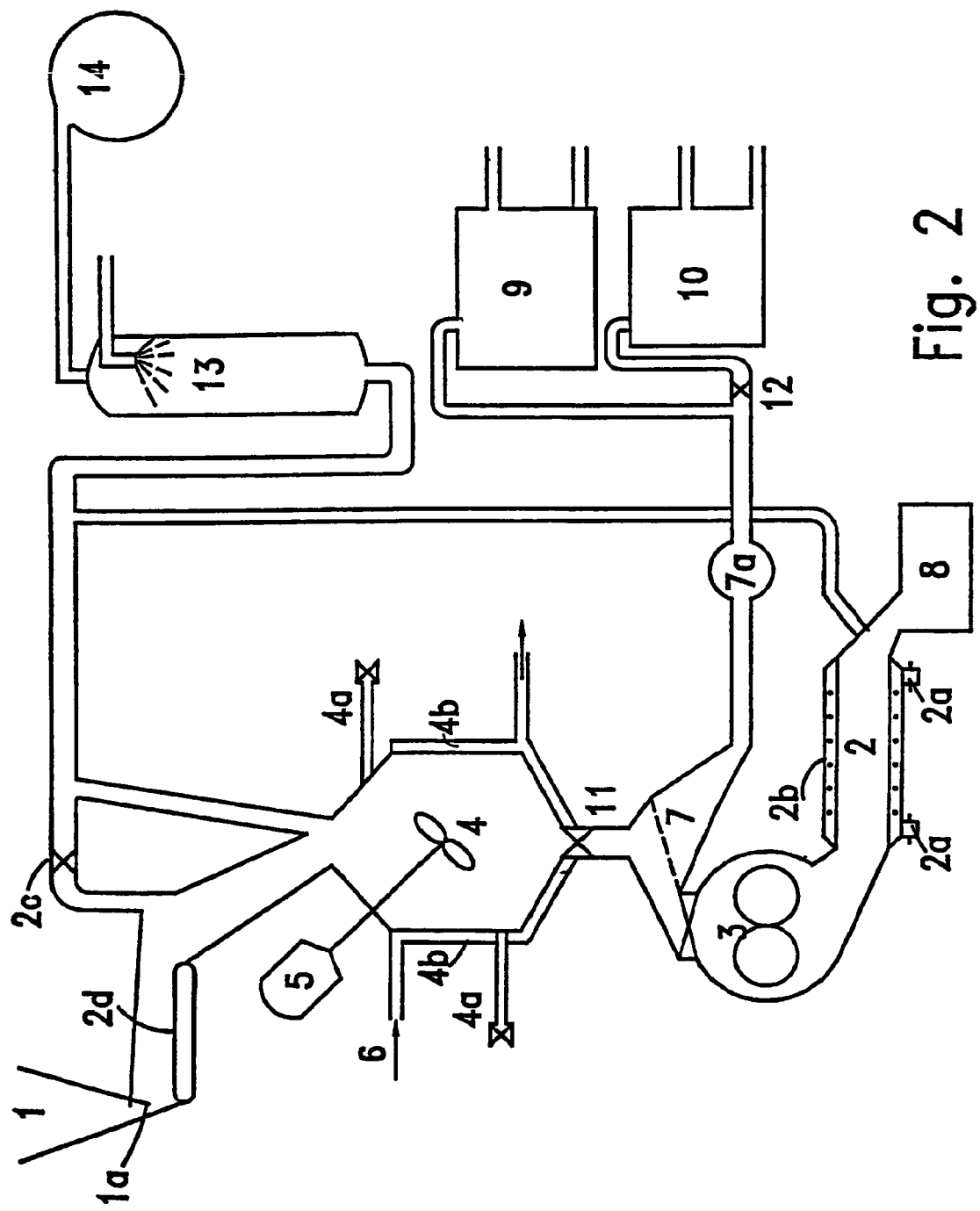
FIG. 2 is a schematic diagram of a further embodiment of an apparatus for performing high efficiency treatment of mixed metal-containing wastes.

According to a preferred embodiment of the present invention, the scrap waste to be treated comprises lithium batteries having compressed $SO_2$ and/or $SOCl_2$ as an electrolyte, or electrical equipment comprising such batteries. The batteries may still be partly or fully charged, and contain lithium metal which may easily ignite and explode if exposed to water and air, producing hydrogen gas. The process of the present invention will render the batteries non-hazardous, while also permitting recovery of the valuable raw materials contained therein. The embodiment of the present invention related to the recovery of valuable metals from electrical equipment and/or batteries will be described with reference to FIG. 2.

The batteries, which are encapsulated in plastic film, but which have their metal leads exposed, are fed at a predetermined rate by a conveying system, 2d, which comprises a conveyor belt which, optionally, may be enclosed in a protected atmosphere, into the reaction chamber, 4. The rate of introduction of the batteries is partly determined by safety considerations (for example, as a function of the energy produced, efficiency of the venting system, hydrogen production and the maximum permissible temperature in the reaction chamber).

The reaction chamber 4 contains a 30% HCl water solution at 50° C. supplemented with 5% $H_2O_2$. The battery lead face, which is an iron alloy, will react with the chloride solution to emit $H_2$, which is vented through the scrubber. The venting system is designed so that the flow of air and the possible $H_2$ production will always be at a level below the critical level for explosions to occur. Generally, $H_2$ concentration may not be permitted to exceed 2% of the total gas volume present in the reaction chamber, at any time.

The chloride solution causes pitting of the battery's metal casing, and eventually will produce tiny holes. The $SO_2$ gas and/or the $SOCl_2$ gas contained within the batteries will be released therefrom, as evidenced by bubbling. Due to the small size of the holes the bubbles will be correspondingly small with a very large surface area. These bubbles will mix well with the hot solution and will react to form sulfuric acid.

A battery that is fully charged will be short-circuited as soon as it contacts the solution. This may, in fact, increase the rate of reaction within the battery, the compressed $SO_2$ escaping from the battery explosion valve. The effect will be accommodated in the reaction chamber because of its size and also since the battery will be beneath the surface of the solution. Gaseous $SO_2$ will react with the water and only traces will be emitted to the surface to be vented to the scrubber (13) further to be absorbed by caustic soda. Once the compressed gas has escaped from the battery, its toxicity and hazard level is greatly reduced. The solution will seep into the battery to react slowly with the Lithium metal to produce LiCl. The reaction is exothermic but because of the slow rate of introduction of the solution through the tiny holes, the temperature level can be controlled. Furthermore, at fast reaction rates, there may be hot spots that may lead to an explosive effect. During the process the metal components will react with the solution to produce metal chlorides such as $FeCl_3$, $NiCl_2$, LiCl, and $CuCl_2$ while the plastic parts will remain largely unreacted. The $SO_2$ absorbed in the solution will add to the acidity and may produce other salts such as $CuSO_4$ and $FeSO_4$.

The metal halides formed in the solution are pumped either directly from the reaction chamber, 4a, or following shredding and/or filtration, to be further treated and separated in separation modules 9 and 10, by known hydrometallurgy techniques. The shredder, 3, and the heating chamber, 2, are both optional, and in one preferred embodiment are located after the liquid/solid filter, 7, such that the solid material that does not pass through said filter is passed on to the shredder, 3. The shredded material leaving shredder, 3, passes into the heating chamber, 2. Residual solids are collected in the optional solids tank, 8, while the gaseous products of the heat treatment are removed via scrubbers, 13, clean air being evacuated by fans, 14.

The unreacted components, mainly plastics, are removed, washed to remove any chloride and further processed either by incineration, land fill or by a known plastic recovery system. In a preferred embodiment the plastic parts are incinerated in order to produce steam for use by the plant.

Figure 3:
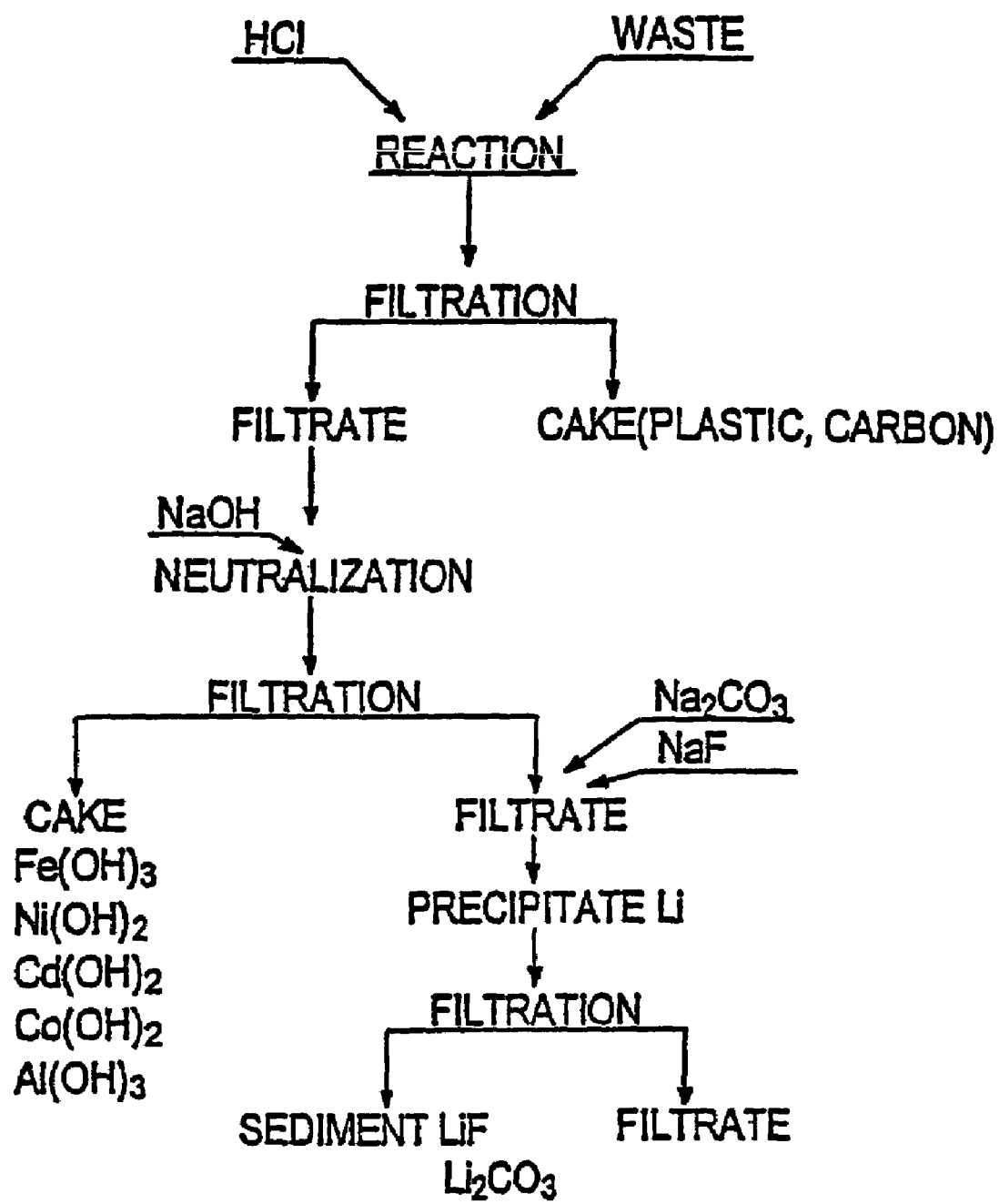
FIG. 3 is a flow chart of one embodiment of the process according to the present invention.

FIG. 3 is a flow chart illustrating the process of the present invention and the recovery of the metals present in electrical batteries employing separation methods based on selective precipitation.

EXAMPLE 1

A single lithium 'D' battery weighing 85 grams, containing 4 g lithium, was placed in 300 mL of a 20% (w/w) solution of aqueous HCl for a period of 90 minutes. The reaction, as evidenced by the appearance of bubbling, began after 7 minutes. The temperature of the solution increased from an initial 21° C. (ambient temperature) to 50° C. after 48 minutes. The maximum temperature reached during the course of the reaction was 65° C. The color of the solution started to become yellow after 11 minutes, due to the absorption of oxides of sulfur by the solution. No explosive events were recorded. Following the reaction, the solution was filtered, and the filtrate was found to contain 3.3 g of lithium. The lithium was recovered from the reaction solution as follows:

Sodium hydroxide was added to the halide solution until a pH of 4–5 was reached, in order to permit precipitation of the hydroxides of most of the metals with the exception of lithium. This mixture was then filtered in order to achieve separation of the solid and liquid phases, the latter containing lithium hydroxide. Sodium carbonate was added to the liquid phase until, at a pH of about 8, a precipitate of lithium carbonate was obtained. This precipitate was then filtered yielding technical grade lithium carbonate, weighing 16 g.

While specific embodiments of the invention have been described for the purpose of illustration, it will be understood that the invention may be carried out in practice by skilled persons with many modifications, variations and adaptations, without departing from its spirit or exceeding the scope of the claims.

The invention claimed is:

1. A process for recovering metals from electrical batteries having metal casings and for rendering hazardous materials present therein non-hazardous, wherein said process comprises the steps of:
   a) placing the electrical batteries while still enclosed in their metal casings in an aqueous solution of HX, wherein X is chlorine or bromine, and mechanically agitating said electrical batteries to form an aqueous reaction mixture into which gases released from said electrical batteries are absorbed;
   b) ventilating hydrogen gas emitted from the solution;
   c) filtering said reaction mixture to form a solid residual waste and a first filtrate containing water-soluble metal halides formed from the reaction of HX and the electrical batteries; and
   d) recovering metals from said metal halides.

2. A process according to claim 1, wherein the mechanical agitation of step (a) comprises shredding the electrical batteries.

3. A process according to claim 2, wherein the electrical batteries are lithium batteries comprising sulfur containing gases, wherein said gases are released from said batteries to become absorbed by the aqueous solution.

4. A process according to claim 3, wherein the metals are recovered by the following steps:
   treating the first filtrate containing the metal halides with an alkaline agent, to precipitate water-insoluble metal hydroxides in said first filtrate;
   separating said metal hydroxides from the liquid phase to obtain solid metal hydroxides and a second filtrate; and
   isolating lithium from said second filtrate.

5. The process according to claim 2, wherein the solution of HX is a solution of HCl having a concentration in the range of 5 to 33 wt %.

6. The process according to claim 5, wherein the HCl solution further comprises from 1 to 10 wt % of HBr.

7. The process according to claim 2, wherein the aqueous solution of HX further comprises an oxidizing agent.

8. The process according to claim 7, wherein the oxidizing agent is $H_2O_2$.

9. The process according to claim 4, wherein the solid metal hydroxides comprise one or more of the following salts: $Fe(OH)_3$, $Ni(OH)_2$, $Cd(OH)_2$, $Co(OH)_2$ and $Al(OH)_3$.

10. The process according to claim 4, wherein the lithium is isolated in the form of lithium carbonate or lithium fluoride.

* * * * *